3,094,383
METHOD FOR MAKING SYNTHETIC ZEOLITIC MATERIAL
Frank J. Dzierzanowski, Bound Brook, and Walter L. Haden, Jr., Metuchen, N.J., assignors to Minerals & Chemicals Philipp Corporation, Menlo Park, N.J., a corporation of Maryland
No Drawing. Filed Dec. 16, 1960, Ser. No. 76,145
12 Claims. (Cl. 23—112)

The subject invention relates to a method for producing a synthetic zeolite of the empirical formula $$Na_2O.Al_2O_3.2SiO_2.4-5H_2O$$

which, upon dehydration, yields a sorbent of controlled effective pore diameter and which is generally known as a "molecular sieve." The invention relates, more specifically, to such a method in which the sorbent and its zeolite precursor are provided directly in the form of coherent attrition-resistant polycrystalline aggregates, as opposed to pulverulent masses produced by prior art methods.

A development in the field of adsorbents which has attracted widespread interest has been the production of so-called "molecular sieves." These are synthetic, crystalline aluminosilicate materials chemically similar to many clays and feldspars, and belonging to the class of minerals known as zeolites. The zeolites possess the characteristic of being able to undergo dehydration with little, if any, change in crystal structure. When dehydrated, the crystals are interlaced with regularly spaced channels of molecular dimensions and of quite uniform size, which led to the term "molecular sieve."

Several types of sieves are commercially available, each of which has a characteristic size of pore. They are being or can be used for a wide variety of applications, some of those with the greatest potential being as a desiccant for drying a wide variety of materials to extremely low moisture content, in purifying high quality chemicals and in upgrading gasoline by selective removal of straight chain hydrocarbons. An application which has received recent wide publicity is as a carrier for high activity accelerators for the rapid cure of plastics and rubber, in which case the sieves greatly simplify storage and processing problems by maintaining the active chemical in latent state, isolated from the system, during processing and storing, releasing it to function in its normal manner at the elevated curing or vulcanization temperature.

Molecular sieves are available in several types, designated, for example, as 3A, 4A, and 5A. Type 3A and type 4A sieves are dehydrated potassium and sodium zeolites, respectively, and type 5A the dehydrated calcium zeolite, the three zeolites having the same crystalline structure and being readily interchangeable by simple base-exchange procedures. The numerical positions of the type designations refer to pore dimensions in Angstrom units. The formulae for A type zeolites from which the type A sieves are prepared by dehydration may be represented by the following approximate empirical formula:

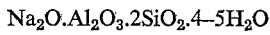

$$X_{\tfrac{20}{v}}.Al_2O_3.2SiO_2.YH_2O$$

wherein X represents a metal in groups I and II of the periodic table, transition metals of the periodic table, hydrogen or ammonium; $v$ represents the valence of X; and Y varies with the nature of X. Thus, for example, the empirical formula for the 4A zeolite is

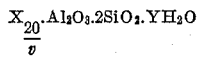

$$Na_2O.Al_2O_3.4-5H_2O$$

Sodium A zeolite may be considered the parent of the other type A zeolites in that it can be base exchanged with other metals of group I and group II metal ions, etc., to prepare other members of the type A zeolites described by the empirical formula given above.

The 4A molecular sieve, which has the empirical formula $Na_2O.Al_2O_3.2SiO_2$, is an outstanding selective sorbent for water although it is also useful in selectively sorbing low molecular weight hydrocarbon vapors from mixtures of low molecular weight hydrocarbons with higher molecular weight hydrocarbons. For example, the 4A molecular sieve is used in sorbing certain C-2 hydrocarbons from mixtures with higher molecular weight hydrocarbons. The 5A molecular sieves are useful in selectively sorbing vapors of normal hydrocarbons from mixtures with branched chained hydrocarbons of similar molecular weight.

Mineral sorbents find widespread use in fixed bed and fluid processes in which the sorbent is employed in the form of coarse particles as opposed to powdered masses. For use in fixed bed processes the sorbent is usually supplied in the form of 10/60 mesh masses whereas finer sorbents are used in fluid bed processes, e.g., 100/325 mesh particles. In the treatment of gases, considerably coarser particles are used, typically 4/8 mesh material. For use in all of the aforementioned processes sorbent particles are preferably regular in shape and size and must be sufficiently hard or attrition resistant that they do not wear away during use, regeneration or other handling.

Prior art methods of producing synthetic crystalline A type zeolites are basically inconsistent with the provision of coarse sorbent particles inasmuch as the zeolite crystals are inherently produced in finely divided powdered form, typically as 0.5 to 5 micron material. In order to agglomerate the powdered zeolites or sorbents to provide granules, pellets or beads, binders, such as clays, are used. Typically, the sorbent powder is prepared and is then extruded with the binder and pellets of suitable size are cut from the extrudate. The pellets are then fired to harden the binder. In order to produce pellets of adequate hardness, substantial quantities of binder are used, usually up to 20 percent or more, based on the weight of the active sorbent. As a result, the pelleted sorbent is actually a heterogeneous material and the sorptive capacity of the sieve is decreased in proportion to its binder content. Moreover, the hardness of the bonded powder leaves much to be desired. Obviously, it would be highly desirable to be able to synthesize the type A molecular sieves directly in the form of large attrition-resistant aggregates of homogeneous polycrystalline composition and, more particularly, to synthesize such sieves in the form of hard smooth pellets or other regularly shaped smooth masses of the desired particle size.

A further disadvantage of prior art methods for preparing type A zeolites is that the product is formed in finely divided condition and is difficult to separate from the aqueous reaction medium.

Accordingly, it is an object of the present invention to provide a method for preparing type A zeolites which obviates the aforementioned difficulties.

Another object of the present invention is the provision of a simple method to synthesize type A zeolites and molecular sieves directly in the form of coherent aggregates of substantially pure homogeneous polycrystalline composition as contrasted with the powdered form in which they are inherently produced by prior art methods for making such zeolites and sieves.

Another object of the invention is the provision of a method to make hard coherent shaped masses of substantially pure type A zeolites and sieves which obviates the step of using an auxiliary material to bind zeolite crystals into agglomerated masses.

Still another object of the invention is the provision of a method for producing substantially pure homogeneous type A zeolites and sieves directly in the form of binder-free, shaped masses which are highly resistant to attrition and disintegration, even in the presence of liquid water.

Another object is the provision of a method of the aforementioned character which obviates the step of separating fine grained crystals from the reaction medium.

These and further objects and advantages, which will be apparent to those skilled in the art, are realized in accordance with the present invention wherein the synthetic crystalline zeolite, which is the precursor of the type A molecular sieve, is produced from certain forms of silica (of a type hereafter set forth) and sodium aluminate by a process in which the zeolite is formed directly as relatively large hard coherent aggregates of substantially pure homogeneous polycrystalline composition, rather than in the form of a powder, as in prior art methods. The zeolite may then be dehydrated to provide a molecular sieve of high purity in the form of a hard coherent aggregate.

A preferred embodiment of our invention involves the preparation of uniformly sized and shaped aggregates of substantially pure type A zeolites and sieves which are hard and cohoerent, although free from binders.

We are aware that silica and sodium aluminate have been employed as starting materials in the production of the 4A zeolite in the process described in U.S. Patent No. 2,841,471 to Sensel. In that process dilute reactants are employed. For example, the proportion of water in the reaction mixture is at least 75 percent by weight, and it is preferably 80 to 90 percent. The resultant zeolite is in the form of a very fine powder which is then pelleted using binders, such as clay. In the present process, however, the zeolite is formed directly in the form of relatively large masses of the desired shape and size without resorting to an extra binding step.

Broadly stated, the process of our invention is characterized by the reaction in situ inter se of a concentrated mixture of silica and aqueous sodium aluminate solution, such mixture being in the form of compact masses containing a limited amount of water hereafter set forth, and quantities of sodium, silica and alumina theoretically required for the formation of a compound of the empirical formula $Na_2O.Al_2O_3.2SiO_2$. The reaction is carried out by aging the reaction masses out of contact with an external aqueous liquid phase and without dehydrating the reaction mixture until the desired crystalline synthetic sodium aluminosilicate is formed. This is accomplished by aging the masses under at least autogenous pressure while controlling the temperature of the masses within the range of about 70° F. to about 200° F. until the masses are crystallized substantially completely into hard aggregates.

An important feature of our process is that the silica and sodium aluminate are reacted while they are in the form of a concentrated mixture and the total water present in the mixture is controlled within the limit of from about 5 to about 25 mols per mol of $Na_2O$ and not in excess of that required to render the mixture moldable into particles of the desired size and form. In accordance with the preferred form of our process, the reactant masses are in the form of particles of the shape and size desired for the ultimate zeolitic material, and this form is retained throughout our process.

The synthetic zeolite obtained in this manner may then be dehydrated to provide a molecular sieve, which will have an effective pore diameter of about 4 Angstrom units or, as is known in the art, the synthetic zeolite may be base exchanged with other ions of metals in group I or with metals of group II of the periodic table, ions of transition metals of the periodic table, hydrogen or ammonium ions, to provide other type A zeolites which, upon dehydration, become sieves of different effective pore diameters.

An advantage of our process is that it obviates the step of filtering a fine grained product from the reaction medium as well as avoiding the step of binding a zeolite powder into the desired coarse particles. In addition to these advantages, we are able to prepare hard pelleted or otherwise regularly shaped, relatively coarse particles of zeolite and sieves without auxiliary binder material, and thus provide a substantially pure type A zeolite or sieve material in the form of hard coherent aggregates which are highly resistant to disintegration, even in the presence of liquid water.

The silica we must employ is in hydrous or finely divided form and is generally characterized by an amorphous structure, as opposed to the various crystalline forms of silica, such as quartz. Suitable fine grained, high purity amorphous silicas are produced commercially in various ways, such as by precipitation from a solution of alkali silicate or by hydrolysis of silicon halides or organic silicon compounds. High purity diatomaceous earth, which is an amorphous form of silica may also be employed as well as the silica residues of silicate minerals originally having continuous silica networks. The latter class of silica is essentially amorphous to X-ray (although it indicates some degree of crystallinity) and is produced by acid decomposition of silicate minerals such as clays, vermiculite and the like, according to methods known to those skilled in the art. Hydrous silicas, such as silica hydrosols may be used, but using hydrous silicas care must be exercised to limit the water associated with the hydrous silica so that the total water in the compact silica-sodium aluminate masses does not exceed about 25 moles per mol of $Na_2O$. Accordingly, the hydrous silica is preferably used in combination with finely divided amorphous forms of silica or a silica residue as described above.

We prefer to use sodium aluminate, $NaAlO_2$, in the form of a freshly prepared viscous, concentrated aqueous solution which is made by reacting hydrous alumina, alumina hydrogel or alumina hydrosol with sodium hydroxide and water. It is essential that the sodium aluminate solution be in concentrated form in order to prevent the hydrolysis of the sodium aluminate with formation of an insoluble alumina compound which will take place in dilute solutions of sodium aluminate in the absence of excess sodium hydroxide. However, we may use a commercially available hydrate of sodium aluminate, $2NaAlO_2.3H_2O$, which contains about 2 to 5 percent by weight of unreacted NaOH. Using this form of sodium aluminate, small amounts of hydrous alumina (e.g., alumina hydrogel or hydrosol) and additional quantities of silica must be incorporated into the silica-sodium aluminate masses to provide the stoichiometric quantities of sodium, silicon and aluminum.

As mentioned, an important feature of our process involves limiting the quantity of water present in the reaction masses to an amount within the range of from about 5 to about 25 mols (including water of hydration of reactants) per mol of $Na_2O$. Ordinarily, about 8 to 15 mols of water per mol $Na_2O$ is employed. Silica-sodium aluminate masses containing less than about 5 mols of water per mol $Na_2O$ are too friable and are apt to disintegrate during handling and reaction; whereas, masses containing excessive water are soft and pasty and the ultimate zeolite is a soft product which is readily disintegrated during use. The optimum amount of water present in the compact reaction masses is dependent to a great extent upon the surface area of the silica employed, with the silicas of higher surface area requiring relatively larger quantities of water than silicas of lower surface area to provide reaction masses of equivalent consistency.

In putting our invention into practice, we form an apparently homogeneous mixture of silica, sodium aluminate and water, using quantities of reactants such that the composition of the reaction mixture, expressed in terms of mol oxide ratios present, is within the following range:

$SiO_2/Al_2O_3$ ---------------------------------- $2 \pm 0.05$
$Na_2O/SiO_2$ ---------------------------------- $0.5 \begin{cases} +0.05 \\ -0.025 \end{cases}$
$H_2O/Na_2O$ ---------------------------------- 5 to 25

Employing mixtures whose compositions fall outside of the range set forth above, the desired pure sodium zeolite A in the form of hard aggregates will not be formed. Thus, if the $SiO_2/Al_2O_3$ ratio is greater than the maximum indicated, the concentration of the sodium zeolite A in the final product will be less than when the stoichiometric $SiO_2/Al_2O_3$ ratio is present. Using $Na_2O/SiO_2$ ratios higher and lower than those indicated results in the formation of a different sodium aluminosilicate in contaminating quantity or to the exclusion of the desired sodium zeolite A. The silica, sodium aluminate gel and water can be mixed in a pug mill, cement mixer or the like.

The resultant mix will be a semisolid mass, the degree of plasticity of which depends principally on the water content. The consistency of the mass should be such that it may be cut or molded into compact masses of the desired form and size which are capable of retaining that form, as opposed to pasty or mushy masses which include excessive quantities of water or friable masses which contain insufficient water and are readily disintegrated by mild pressure or movement. The mix may be molded into particles of the desired form and size by any suitable particle forming method such as, for example, by pilling, sphering or by extrusion through a die plate to form pellets. The silica-sodium aluminate mixture may be spray dried to form reaction masses in microspherical form by initially forming a dilute aqueous slurry of the silica-sodium aluminate mixture, e.g., a slurry having a 10 percent to 25 percent solids content. The water content of this slurry is reduced to an amount within the range of about 5 to 25 mols per mol of $Na_2O$ by spraying the slurry into an inert evaporative medium, such as warm air, thereby forming coherent microspherical particles which upon aging crystallize into the desired zeolite in the form of microspheres.

Irrespective of the particular size and shape of the compact silica-sodium aluminate mixture used, the reaction between the sodium, silica and aluminum is carried out by aging the reactants under at least autogenous pressure at a product temperature within the range of about 70° F. to about 200° F. and preferably at about 100° F. to 185° F. At temperatures below 100° F. aging is too slow, whereas particles aged above 185° F. tend to dehydrate. We have found that the masses must be aged under conditions which preclude their dehydration in order to preclude the formation of a crystalline contaminant which is believed to be basic sodalite. As hereinabove mentioned, the masses are reacted in the absence of an external aqueous phase, which is to say that the masses are not immersed in an aqueous reaction medium. Immersing the masses in water at the initial stage of the aging precludes formation of the desired zeolite in pure form in that constituents of the masses or leached therefrom and reaction products other than the amorphous precursor of the zeolite are formed. Aging the particles at the latter stages of the reaction in the presence of water, as by refluxing them, results in a marked loss of particle hardness. The masses may be aged in the presence of air or other inert heat transfer medium such as a water-immiscible hydrocarbon oil (e.g., kerosene, white mineral oil) or sand, which help maintain the temperature of the masses below that at which a spontaneous exotherm with consequent formation of contaminants may take place. The reaction requires at least about 24 hours for completion, depending on the aging temperature. To insure the completion of the crystallization, an aging period of 48 to 96 hours or more may be preferable. To determine the minimum reaction time required for the completion of the reaction between the alkali and dehydrated clay and the crystallization of the reaction product under the particular operating conditions employed, samples of the reaction product may be taken after various aging intervals and the intensity of the X-ray diffraction maxima characteristic of the desired crystalline zeolite studied; the aging period should be prolonged until the product gives rise to an intense X-ray diffraction maxima characteristic of the desired zeolite.

As mentioned, the aging is conducted under conditions which prevent dehydration of the reactants and for this reason a closed reaction vessel is used. It is important to note that the aging may be prolonged to a month or longer without adverse effect and without danger of forming contaminating compounds. Intense agitation is avoided during the aging to insure that the crystallized particles will be in essentially the same form as the molded reactants.

The crystalline 4A zeolite produced by the method described above may be dehydrated substantially completely to form the sieve material by calcining the particles at a temperature within the range of from about 220° F. to about 1000° F. and preferably between about 400° F. to about 700° F.; alternatively the aged particles may be base exchanged by means which are known to those skilled in the art.

The following examples of the practice of our invention are given for illustrative purpose only and are not to be construed as limiting the invention thereto.

EXAMPLE I (a) This example further illustrates the production of hard, binder-free pellets consisting essentially of pure 4A sodium zeolite by our process.

A sodium aluminate solution is prepared by dissolving 8 parts by weight sodium hydroxide in 9 parts by weight of water and adding 15.7 parts by weight of hydrated alumina (analyzing 35.0 percent water of hydration). The mixture is boiled and stirred until the alumina dissolved giving a translucent solution which became very viscous on cooling to room temperature.

12.7 parts by weight of Syloid 72 (a functional silica pigment analyzing 5.5 percent combined water) and providing 12.1 parts by weight of $SiO_2$ is mixed to apparent homogeneity with the sodium aluminate hydrosol together with 3.3 parts by weight of water. The composition of the resultant mix is as follows:

|  | Mols | Parts by weight |
|---|---|---|
| $Na_2O$ | 0.1 | 6.2 |
| $Al_2O_3$ | 0.1 | 10.2 |
| $SiO_2$ | 0.2 | 12.1 |
| $H_2O$ (total) | 1.1 | 20.2 |

The mixture is compressed in a Carver press using a 1-inch die and formed into 1-inch pellets about 1-inch long. The pellets are placed in sealed glass containers in an oven maintained at 100° F. for 18 hours and will be very hard at this stage. Analysis of X-ray diffraction intensity maxima will show that only a very minor amount of the 4A zeolite is formed at this point.

The pellets are further aged to effect their crystallization in the sealed jars at 200° F. for 24 hours.

(b) Repeating the general procedure employed in Example I(a) but using 20, 30 and 40 mols of water per mol $Na_2O$ as in Example I(a) the mix will be too soft to form pellets and the mixture, after crystallization as in Example I(a), will be a soft, readily friable mass of the type A crystals which will require the use of a binder to form hard pellets.

(c) Substituting Syloid 244, another functional silica pigment (6.34 percent combined water), hard pellets are formed using 20 mols $H_2O$ per mol $Na_2O$ although soft, readily crumbled zeolitic masses result using 30 to 40 mols $H_2O$ per mol $Na_2O$.

EXAMPLE II 4A zeolite pellets are prepared from the following reaction mixture: 10.6 parts by weight of silica hydrosol (containing 3.1 parts by weight of silica and 0.04 part by weight of $Na_2O$); 9.6 parts by weight Syloid 244 containing 9.0 parts by weight $SiO_2$; and 27.4 parts by weight of a freshly prepared sodium aluminate solution containing 6.2 parts by weight $Na_2O$ and 10.2 parts by weight of $Al_2O_3$. The mol ratio of $H_2O$ to $Na_2O$ in the mixture is about 10 to 1. The mixture is formed into 1-inch pellets and the pellets placed in sealed glass vessels and maintained at about 75° F. for 24 hours after which the pellets are further aged in the sealed containers for 24 hours at 200° F.

EXAMPLE III

This example illustrates the production of sodium zeolite A using as a reactant the finely divided silica residue of kaolin clay analyzing (on a weight basis) 88 percent $SiO_2$, 1 percent $Al_2O_3$, 10 percent loss on ignition, and the balance essentially $Fe_2O_3$ and $TiO_2$. The residue is prepared by reacting kaolin clay with concentrated sulfuric acid and leaching the reaction product.

A reaction mixture of 13.7 parts by weight of the silica residue containing 12.1 parts by weight of $SiO_2$ is mixed with a cool sodium aluminate solution containing 16.4 grams sodium aluminate, 6.2 parts $Na_2O$ and 10.2 parts $Al_2O_3$. The total water in the mixture is 18 parts by weight representing a $H_2O/Na_2O$ mol ratio of 10/1. The mixture is formed in pellets and the pellets placed in an enclosed column throughout which white mineral oil is continuously circulated. The oil temperature is maintained at about 100° F. for 24 hours and is increased to 200° F. and maintained at the latter temperature for 24 hours. Oil is drained from the crystallized pellets which are then stripped with steam.

EXAMPLE IV

Commercial $2NaAlO_2 \cdot 3H_2O$ (3 percent free NaOH) is used with Syloid 72 in preparing the sodium zeolite A in pelleted form by dissolving 13.0 parts by weight of sodium aluminate in 8 parts by weight of water, together with 4.0 parts by weight of alumina hydrogel containing 15 percent $Al_2O_3$ and mixing in 6.85 parts Syloid 72 containing 6.05 parts $SiO_2$. The mixture is aged to form the 4A zeolite as described in Example I(a).

EXAMPLE V

This example illustrates the importance of preventing dehydration when aging the pellets.

24.5 parts by weight of 98 percent NaOH pellets were dissolved in 24 parts by weight of distilled water. To this solution there was added 47.1 parts by weight of a hydrated alumina containing 30.6 parts by weight $Al_2O_3$. The slurry was boiled until a clear solution was obtained. The solution was cooled; during boiling, 11.0 parts by weight of water evaporated. 38.1 parts by weight of Syloid 72 and 12.2 parts by weight of water were blended with the freshly prepared sodium aluminate gel and the mixture (analyzing $1Na_2O:1Al_2O_3:2SiO_2:9.1H_2O$) was formed into pellets under a pressure of 500 p.s.i.g. Weighed fractions of the pellets were placed in tared glass jars which were sealed. Individual jars were aged at various temperatures and times, and the water loss and X-ray diffraction patterns of the aged pellets were correlated with the aging conditions, with the results summarized in the accompanying table.

The data reported in the table show that sodalite contaminant was present in all products in which significant dehydration took place during aging, with the quantity of sodalite being directly affected by the extent of dehydration. For example, small quantities of sodalite appeared in samples E and F which had undergone a small amount of dehydration, whereas no sodalite was present in samples A to D which did not undergo significant dehydration. On the other hand, the product aged at 290° F. with appreciable dehydration (sample G) was composed essentially of sodalite, with no detectable quantity of the desired 4A zeolite being present.

The data show also that aging must be carried out for a period sufficiently long at the aging temperature to effect the crystallization of the pellets into the 4A zeolite. Twenty-four hours was an insufficient aging time at an aging temperature of 100° F. (sample A), but was adequate at aging temperatures of 150° F. and 200° F. (samples C and E).

Table

CORRELATION BETWEEN EXTENT OF WATER LOSS DURING PELLET AGING AND CRYSTALLINE PHASES PRESENT IN THE AGED PELLETS

| Sample | Aging Conditions [1] | Percent Water Loss During Aging | X-Ray Diffraction Intensity Maxima [2] | |
|---|---|---|---|---|
| | | | 7.22θ (4A Zeolite) | 14.02θ (Sodalite) |
| A | 100° F./24 hrs | 0.0 | 3 | 0 |
| B | 100° F./24 hrs., 200° F./24 hrs. | 0.0 | 47 | 0 |
| C | 150° F./24 hrs | 0.5 | 44 | 0 |
| D | 150° F./24 hrs., 200° F./24 hrs. | 0.0 | 47 | 0 |
| E | 200° F./24 hrs | 1.6 | 42 | 4 |
| F | 200° F./48 hrs | 2.8 | 43 | 5 |
| G | 290° F./24 hrs | 8.2 | 0 | 26 |

[1] Oven temperatures reported.
[2] X-ray patterns obtained using Kα doublet of copper, an X-ray diffractometer using a scintillation counter and strip chart pen recorder. From the recording of peak heights and positions as a function of the Bragg angle, the relative intensity of the peaks corresponding with the recorded lines was determined. All products were equilibrated at 40% R.H. and 77° F. prior to obtaining X-ray diffraction patterns.

We claim:

1. A method for making a synthetic zeolite directly in the form of coherent polycrystalline aggregates which comprises forming reaction masses consisting of an apparently homogeneous mixture of sodium aluminate, at least one siliceous material selected from the group consisting of hydrous silica, finely divided amorphous silica and the finely divided silica residue of a silicate mineral originally having a continuous network, and water, said mixture having a composition, expressed in terms of mol oxide ratios, which falls within the range:

$SiO_2/Al_2O_3$ ---------- $2 \pm 0.05$ $Na_2O/SiO_2$ ---------- $0.5 \begin{cases} +0.05 \\ -0.025 \end{cases}$ $H_2O/Na_2O$ ---------- 5 to 25 aging said masses while maintaining them out of contact with an external aqueous liquid phase while preventing said masses from dehydrating for a time sufficient to crystallize the masses into the desired crystalline zeolite in the same form as said reaction masses.

2. The method of claim 1 wherein said masses are reacted while they are immersed in and in contact with a water-immiscible hydrocarbon liquid.

3. The method of claim 1 wherein said masses are aged at a temperature within the range of from about 100° F. to about 185° F. under at least autogenous pressure.

4. A method for making a synthetic zeolite directly in the form of coherent polycrystalline aggregates which comprises forming an apparently homogeneous mixture consisting of a freshly prepared sodium aluminate gel, hydrous amorphous silica and water, said mixture having a composition, expressed in terms of mol oxide ratios, which falls within the range:

$SiO_2/Al_2O_3$ ---------- $2 \pm 0.05$ $Na_2O/SiO_2$ ---------- $0.5 \begin{cases} +0.05 \\ -0.025 \end{cases}$ $H_2O/Na_2O$ ---------- 5 to 25 forming said mixture into shaped masses and aging said shaped masses while maintaining them out of contact with an external aqueous liquid phase and while controlling the temperature of said masses within the range of from about 70° F. to about 200° F. under at least autogenous pressure so as to prevent evaporation of water from said masses for a time sufficient to crystallize the reacted masses into the desired crystalline zeolite in the same form as said reaction masses.

5. The method of claim 4 wherein said masses are reacted while they are immersed in and in contact with an immiscible hydrocarbon liquid.

6. The method of claim 4 wherein said masses are reacted at a temperature within the range of from about 100° F. to about 185° F. for at least 24 hours.

7. A method for making a synthetic zeolite directly in the form of self-coherent crystalline shaped masses which comprises forming a concentrated aqueous solution of sodium aluminate, before said sodium aluminate solution hydrolyzes mixing therein at least one siliceous material selected from the group consisting of hydrous silica, finely divided amorphous silica and the finely divided silica residue of a silicate mineral originally having a continuous network, in amount such as to form a moldable mixture having a composition, expressed in terms of mol oxide ratios, which falls within the range:

$SiO_2/Al_2O_3$ ---------------------------- $2 \pm 0.05$
$Na_2O/SiO_2$ ---------------------------- $0.5 \genfrac{\{}{.}{0pt}{}{+0.05}{-0.025}$
$H_2O/Na_2O$ ---------------------------- 5 to 25 forming said mixture into shaped masses, aging said shaped masses while maintaining them out of contact with an external aqueous liquid phase and while controlling the temperature of said pellets within the range of from about 70° F. to about 200° F. under at least autogenous pressure so as to prevent substantially evaporation of water from said pellets for a time sufficient to crystallize the pellets into the desired crystalline zeolite.

8. A method for making a synthetic zeolite directly in the form of shaped masses which comprises mixing to apparent homogeneity freshly prepared, concentrated aqueous sodium aluminate solution and hydrous amorphous silica in amounts such that the composition of the mixture, expressed in terms of mol oxide ratios, falls within the range:

$SiO_2/Al_2O_3$ ---------------------------- $2 \pm 0.05$
$Na_2O/SiO_2$ ---------------------------- $0.5 \genfrac{\{}{.}{0pt}{}{+0.05}{-0.025}$
$H_2O/Na_2O$ ---------------------------- 5 to 25 forming shaped masses from said mixture, reacting said masses while maintaining them out of contact with an external aqueous liquid phase and while controlling the temperature of said masses within the range of from about 70° F. to about 200° F. under at least autogenous pressure so as to prevent substantially evaporation of water from said masses for a time sufficient to crystallize the reacted masses into the desired crystalline zeolite in the form of the original shaped masses.

9. The method of claim 8 wherein said masses are reacted at a temperature within the range of from about 100° F. to about 185° F.

10. The method of claim 8 wherein said masses are reacted at a temperature within the range of from about 100° F. to about 185° F. while said masses are surrounded by and in contact with air.

11. The method of claim 8 wherein said masses are reacted at a temperature within the range of from about 100° F. to about 185° F. while said masses are surrounded by and in direct contact with an immiscible nonreactive hydrocarbon liquid.

12. A method for making a synthetic zeolite in the form of microspheres which comprises forming a homogeneous aqueous mixture of sprayable consistency and consisting essentially of water, sodium aluminate and at least one siliceous material selected from the group consisting of hydrous silica, finely divided amorphous silica and the finely divided silica residue of a silicate mineral originally having a continuous network, said mixture having a composition, expressed in terms of mol oxide ratios, which falls within the range:

$SiO_2/Al_2O_3$ ---------------------------- $2 \pm 0.05$
$Na_2O/SiO_2$ ---------------------------- $0.5 \genfrac{\{}{.}{0pt}{}{+0.05}{-0.025}$ spraying said mixture into an inert evaporative media so as to form microspheres having a $H_2O/Na_2O$ mol ratio within the limits of 5 to 25, aging said microspheres while maintaining them out of contact with an external aqueous liquid phase and while preventing said microspheres from dehydrating for a time sufficient to crystallize said microspheres into a uniform crystalline composition.

References Cited in the file of this patent

UNITED STATES PATENTS 2,143,670   Young ---------------- Jan. 10, 1939
2,841,471   Sensel ---------------- July 1, 1958

OTHER REFERENCES

Kumins et al., Ind. and Eng. Chem., 45, 567–72 (1953).